Oct. 3, 1939.  J. S. REID  2,174,530
WINDOW GUIDING AND CUSHIONING MEANS
Filed Jan. 17, 1936
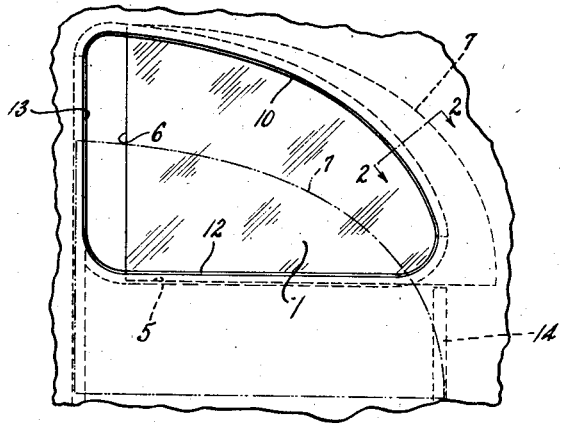
FIG. — 1
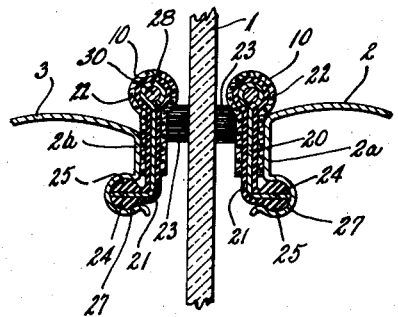
FIG. — 2
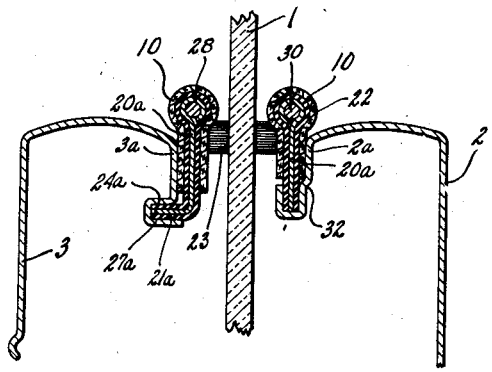
FIG. — 3
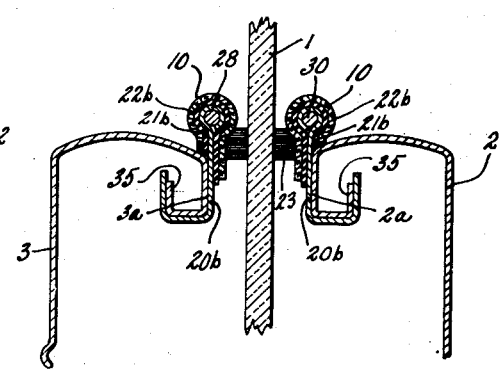
FIG. — 4
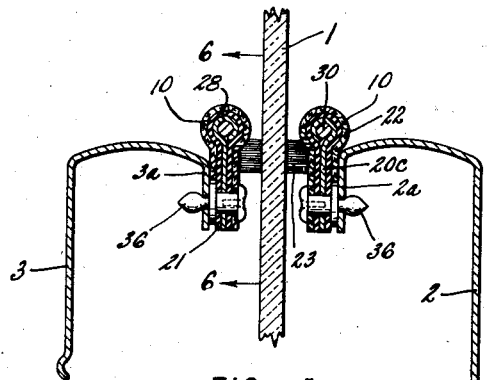
FIG. — 5
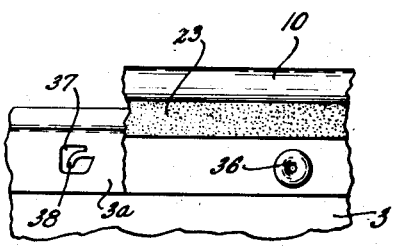
FIG. — 6
INVENTOR
JAMES S. REID
ATTORNEYS Patented Oct. 3, 1939

2,174,530

UNITED STATES PATENT OFFICE 2,174,530

WINDOW GUIDING AND CUSHIONING MEANS

James S. Reid, Shaker Heights, Ohio, assignor, by mesne assignments, to The Standard Products Company, Cleveland, Ohio, a corporation of Ohio Application January 17, 1936, Serial No. 59,585

5 Claims. (Cl. 296—44.5)

This invention relates to improvements in guiding and cushioning means for slidable window panes, such as the window panes of automobile bodies and the like.

The general object of the present invention is the provision of window pane guiding and cushioning means which is of simple and durable construction capable of being manufactured and sold at low cost and of such character that it effectively performs its guiding and cushioning functions.

A more specific object of the present invention is the provision of window pane guiding and cushioning means which is adapted to be easily and quickly connected, without the use of screws, rivets or the like, to the structure having the window pane which is to be guided and cushioned.

Another more specific object of the present invention is the provision of window pane guiding and cushioning means in the form of two separate and independent guiding and cushioning strips arranged in spaced relation opposite each other and adapted to guide and cushion therebetween a slidable window pane, including a window pane having slidable movement in both horizontal and vertical directions.

With the foregoing and other objects in view which will appear as the description of the present invention proceeds, said invention resides in the combination and arrangement of parts and in the details of construction hereinafter claimed, it being understood that changes in said invention as herein disclosed may be made without departing from the scope or the spirit of said invention.

The present invention will be readily understood from the following description of four embodiments thereof, reference being had to the accompanying drawing in which Fig. 1 is a side view of a portion of an automobile body having a window pane opening and a slidable window therefor, said body having associated therewith the present window pane guiding and cushioning means; Fig. 2 is a detail cross-sectional view, on the line 2—2, Fig. 1; Figs. 3, 4 and 5 are views similar to Fig. 2 and showing three other embodiments of the present invention; and Fig. 6 is a detail vertical sectional view of the embodiment of Fig. 5, the view being on the line 6—6, Fig. 5.

That portion of the automobile body which has the slidable window pane 1 whose movements are to be guided and cushioned by the present improved guiding and cushioning means includes an outside wall 2 and an inside wall 3, said walls being of sheet metal, as is usual. The window pane 1 is what is known in the automobile trade as a quarter window, said pane having a generally horizontally disposed bottom edge portion 5, a generally vertically disposed front edge portion 6 and a downwardly curving top edge portion 7. Said window pane is therefore of generally triangular shape, and the window opening to be closed and exposed thereby is of corresponding shape, as shown.

The mechanism for supporting said window pane, and for effecting both vertical and horizontal movement thereof, may be of any suitable construction, and inasmuch as it forms no part of the present invention, it is not here shown. For the purposes of this application, it is sufficient to say that such mechanism may be operated to effect vertical movement of said window pane, to partly expose the window opening, as shown in dotted lines, Fig. 1, and may also be operated to effect horizontal movement of said window pane, to expose only the front portion of said window opening, as shown in full lines, Fig. 1.

Because of the continuously decreasing height of the window pane 1, from the front to the rear thereof, and because of the horizontal movement thereof, the guiding and cushioning means for the top edge portion 7 of said window pane is in the form of two separate and independent guiding and cushioning strips 10 (Fig. 1) arranged in spaced relation opposite each other, said strips 30 being adapted for easy and quick individual attachment, without the use of screws, rivets or the like, to the automobile body walls 2 and 3 adjacent the top portion of the window opening, as shown in Fig. 1.

To properly guide and cushion the window pane 1 in its vertical movement, guiding and cushioning strips 12, Fig. 1, identical in construction to that of the strips 10, are secured to the automobile body walls 2 and 3 adjacent the bottom portion of the window opening, as also shown in Fig. 1.

To receive the front edge portion 6 of the window pane 1 when said window pane is in closing position, and to also guide said front edge portion of the window pane during vertical movement thereof, guiding and cushioning means 13 (Fig. 1) of channel form is utilized, which channel means may be of the character disclosed in my prior Patent No. 1,918,666, granted July 18, 1933, for Glass run channel. This channel-shaped guiding and cushioning means 13 for the front edge portion 6 of the window pane 1 extends not only along the front portion of the window opening but also, below such window opening, being secured to the automobile body walls 2 and 3 in any suitable manner. To aid in guiding the window pane 1 during vertical movement thereof, channel-shaped guiding and cushioning means 14 (Fig. 1) of the character disclosed in my aforesaid patent are also utilized at the rear end of the window opening, said guiding and cushioning means extending below the window opening, as shown in Fig. 1.

The separate and independent window pane guiding and cushioning strips forming the subject matter of this application are specifically illustrated in Figs. 2 to 6 inclusive, there being one embodiment of the invention illustrated in Fig. 2, a second in Fig. 3, a third in Fig. 4 and a fourth in Figs. 5 and 6.

In the embodiment of the invention illustrated in Fig. 2, each of the guiding and cushioning strips includes a relatively narrow sheet metal member 20 having a coating of rubber 21 and a woven fabric covering 22 adhesively secured to said rubber and provided along a portion only of its width with a relatively heavy pile surface 23 for window pane guiding and cushioning purposes.

As shown, the inner longitudinal edge portion 24 of the metal member 20 of each such strip is bent laterally, with such edge portions 24 of the two strips extending in opposite directions, and the rubber coating on each such laterally bent edge portion 24 is suitably thickened, as at 25, to substantially cylindrical form. The laterally bent inner longitudinal edge parts of the two guiding and cushioning strips are thus adapted for longitudinal securement, by simple and easily effected snap-action and without the use of screws, rivets or the like, in longitudinally disposed, generally cylindrical grooves 27 in the generally parallel flanges 2a and 3a of the body walls 2 and 3, the intermediate parts of said guiding and cushioning strips lying against or alongside said flanges, as shown.

The outer or free longitudinal edge portion of the metal member 20 of each such guiding and cushioning strip is provided at its outer or free longitudinal edge with a suitable longitudinally disposed bead 28 within which is arranged a suitable reinforcing wire 30. This bead and wire enlarge to substantially cylindrical form the outer, exposed longitudinal edge part of each of the guiding and cushioning strips and result in giving the window opening a more finished appearance about its periphery, as indicated in Fig. 1 and as will be readily understood.

In the embodiment of the invention illustrated in Fig. 3, those portions of the rubber coating 21a on the laterally bent inner longitudinal edge portion 24a of the metal member 20a of each guiding and cushioning strip is not thickened, as in the embodiment of Fig. 2, and the grooves 27a in the parallel flanges 2a and 3a for receiving the laterally bent inner longitudinal edge parts of the two strips are of simple channel form. To securely maintain these guiding and cushioning strips in assembly with such wall flanges 2a and 3a, the side walls of the grooves 27a are clamped about said laterally bent strip parts at suitably spaced intervals, as indicated at 32 and as will be readily understood.

In the embodiment of the invention illustrated in Fig. 4, the rubber coating 21b and the fabric covering 22b of the guiding and cushioning strips do not extend to the inner longitudinal edges of the metal members 20b thereof, and the uncovered inner longitudinal edge portions of such metal members are bent laterally, in opposite directions, around the generally hook-shaped edge portions 35 of the generally parallel flanges 2a and 3a of the body walls 2 and 3, thereby effecting the securement of these guiding and cushioning strips to the body walls 2 and 3 without the use of screws, rivets or the like.

In the embodiment of the invention illustrated in Figs. 5 and 6, the metal members 20c of the two guiding and cushioning strips are not laterally bent, as in the foregoing embodiments, the strips of this embodiment being provided, at suitable intervals along their length, with laterally extending studs 36 adapted to be pushed through suitable apertures 37 in the simple straight flanges 2a and 3a of the body walls 2 and 3, as clearly shown in Fig. 5. As best shown in Fig. 6, such body wall flanges are provided with integral yieldable fingers 38 extending into such apertures 37, said fingers being adapted to be pushed to one side by said studs and serving to effectively maintain said studs in such apertures, and hence the strips in assembly with body walls 2 and 3, all as will be readily understood.

The metal members of the present improved guiding and cushioning strips are preferably formed in one piece, and the piece longitudinally separated into two parts after the rubber coating has been applied thereto. If desired, the fabric covering of the strips may also be applied before such separation occurs. The reinforcing wires 30 in the outer beads of the strips not only strengthen the strips after formation thereof but also aid in their formation, particularly in the application of the rubber coating.

By having parts of the guiding and cushioning means for the window 1 in the form of separate, opposed strips, said window is free to move in both vertical and horizontal directions, with proper guiding and cushioning thereof at all times. In its horizontal movements, the window slides through the rear portions of the upper guiding and cushioning strips 10, the window being guided and cushioned just as effectively by these narrow strips as it would be in channel-shaped guiding and cushioning means with side walls of the requisite great depth.

Other features and advantages of the present invention will be apparent to those skilled in the art to which it relates.

What I claim is:

1. In combination with a structure having a window opening and a slidable window pane therefor, guiding and cushioning means for such window pane comprising two separate and generally flat guiding and cushioning strips individually carried by said structure in opposed relation and adapted to have said window pane slide therebetween, at least the major portion of each of such strips being generally parallel with the path of movement of said window pane, each of said guiding and cushioning strips including a sheet metal body part and a yieldable rubber part, portions of the rubber parts of said strips being enlarged for detachable connection of said strips to said structure.

2. In combination with a structure having a window opening and a slidable window pane therefor, guiding and cushioning means for said window pane comprising two separate and independent strips between which said window pane is adapted to slide, each having a generally flat window guiding and cushioning part and a beaded edge securing part, said structure being provided adjacent said window opening with two spaced and opposed wall portions along and in contact with which lie the generally flat guiding and cushioning parts of said strips, said wall portions being provided with grooves in which are detachably secured the beaded edge securing parts of said strips.

3. In combination with a structure having a window opening and a slidable window pane therefor, guiding and cushioning means for such window pane and comprising two separate and independent guiding and cushioning strips arranged in spaced relation opposite each other and between which said window pane is adapted to slide, each of said strips including a sheet metal body part having its outer longitudinal edge portion of beaded form and in which is arranged a longitudinally disposed reenforcing wire, said structure being provided adjacent said window opening with two opposed grooves in which are secured the inner longitudinal edge portions of such strips.

4. In combination with a structure having a window opening and a slidable window pane therefor, guiding and cushioning means for such window pane and comprising two separate and independent guiding and cushioning strips arranged in spaced relation opposite each other and between which said window pane is adapted to slide, each of said strips including a sheet metal body part having its outer longitudinal edge portion of beaded form and in which is arranged a longitudinally disposed reenforcing wire, said structure being provided adjacent said window opening with two opposed grooves in which are secured the inner longitudinal edge portions of such strips, the inner longitudinal edge portions of such strips being laterally bent.

5. In combination with a structure having a window opening and a slidable window pane therefor, guiding and cushioning means for such window pane and comprising two separate and independent guiding and cushioning strips arranged in spaced relation opposite each other and between which said window pane is adapted to slide, each of said strips including a sheet metal body part having its outer longitudinal edge portion of beaded form, said structure being provided adjacent said window opening with two opposed grooves in which are secured the inner longitudinal edge portions of such strips.

JAMES S. REID.